June 23, 1925.         1,543,077
J. H. GALL ET AL
COMBINED SAFETY VALVE AND SIGNAL FOR PNEUMATIC TIRES
Filed Oct. 3, 1922
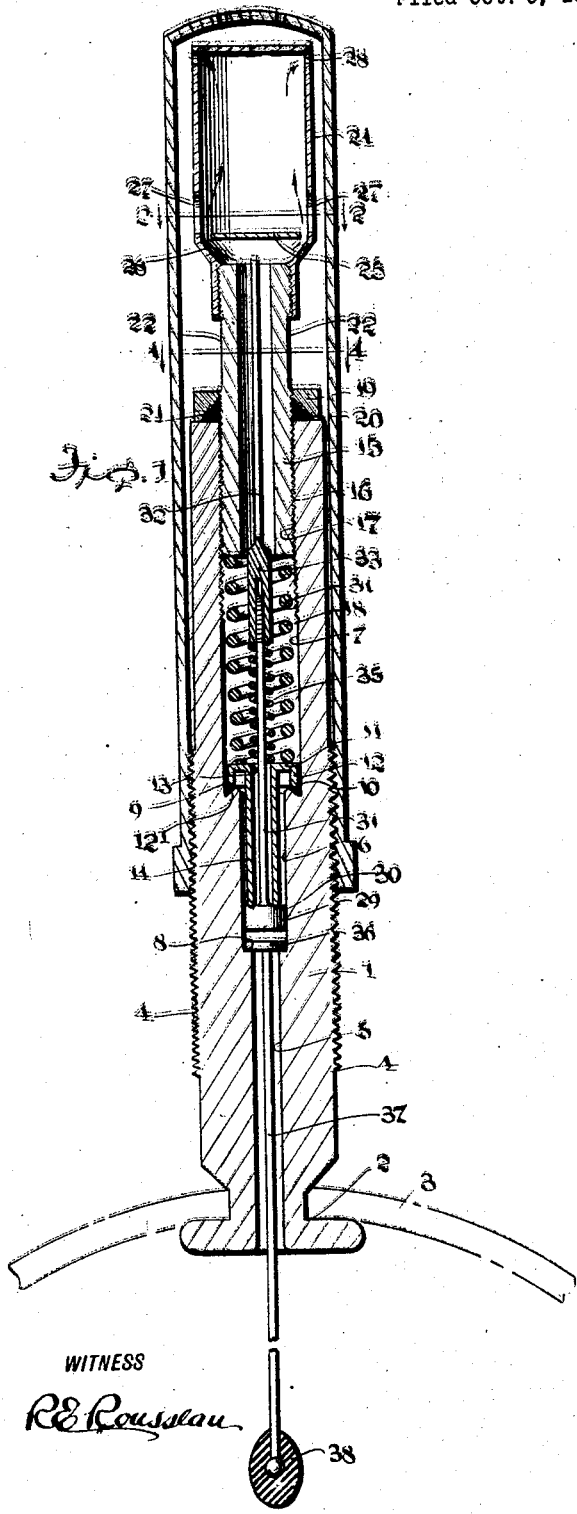
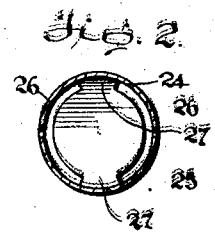
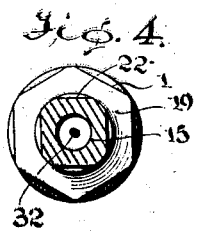
WITNESS
R E Rousseau
INVENTORS
J. H. Gall,
Gus Swanson,
BY
ATTORNEYS Patented June 23, 1925.

1,543,077

UNITED STATES PATENT OFFICE.

JOHN HAMILTON GALL AND GUS SWANSON, OF MARSHFIELD, OREGON.

COMBINED SAFETY VALVE AND SIGNAL FOR PNEUMATIC TIRES.

Application filed October 3, 1922. Serial No. 592,124.

*To all whom it may concern:*

Be it known that we, JOHN H. GALL, a citizen of the United States, and GUS SWANSON, a subject of the King of Sweden, and residents of Marshfield, in the county of Coos and State of Oregon, have invented certain new and useful Improvements in Combined Safety Valves and Signals for Pneumatic Tires, of which the following is a specification.

Our invention is a combined safety-valve and signal for pneumatic tires, and it consists in the combinations, constructions and arrangements herein described and claimed.

An object of our invention is to provide a device of the character described which is adapted to be attached to a conventional inner tube or pneumatic tire for automobiles in an ordinary manner and which embodies means operable to permit the inflation of the tire or tube to which applied and for preventing the escape of pressure fluid from the tire or tube until excess pressure develops therein or until the pressure within the tire or tube is sufficiently low to permit the partial collapse thereof when in service, whereupon pressure fluid will be permitted to escape from the tire or tube through the device.

A further object of our invention is to provide a device of the character described which is adapted to give an audible signal when pressure fluid is escaping therethrough.

A still further object of our invention is to provide a device of the character described which includes high pressure relief means adjustable to operate at various predetermined pressures and means for indicating at a given time the pressure at which the relief means will be actuated.

A still further object of our invention is to provide a device of the character described which is simple in construction, effective for the purpose intended and thoroughly practical commercially.

Other objects and advantages will be apparent from the following description and the novel features of the invention will be particularly outlined in the appended claims.

Our invention is illustrated in the accompanying drawings, forming a part of this application in which:

Figure 1 is a longitudinal section through a practical embodiment of the invention in applied position on a pneumatic tire, a portion of the latter being shown more or less diagrammatically, Figure 2 is a section along the line 2—2 of Figure 1, Figure 3 is a perspective view of an adjusting bushing comprised in the embodiment of the invention exhibited in Figure 1, and Figure 4 is a section along the line 4—4 of Figure 1.

In carrying out our invention, we provide a tubular stem or body 1 which is formed at one end as at 2, for engagement in an ordinary manner with the usual opening in a pneumatic tube or tire 3. The stem or body 1 may be screw threaded externally as at 4, for part or all of its length for engagement with any ordinary threaded means for locking the stem to a wheel rim (not shown) upon which the tire or tube 3 may be mounted.

The longitudinal bore of the stem 1 comprises an inner end portion 5 of uniform diameter and extending a determined distance from the end of the stem attached to tube or tire, an intermediate portion 6 of greater diameter than the end portion 5, and an outer end portion 7 of still greater diameter than the intermediate portion 6. An annular shoulder 8 is thus defined between the inner end portion 5 and the intermediate portion 6 and the latter is merged into the outer end portion 7 by an annular shoulder 9.

The shoulder 9 is provided with an annular groove 10 in its face and a valve disc 11 slidably disposed in the bore portion 7 has an annular flange 12 fashioned at its outer end to seat in the groove in such manner as to compress in the groove a packing ring of rubber or other compressible material. The valve disc 11 is formed with a central opening 13 from which a tubular valve stem 14 extends in concentric relation to the flange 12 and beyond the shoulder 9 into the bore portion 6, being loosely received in the latter so that a space is provided between the valve stem 14 and the wall of the bore portion 6.

A bushing 15 has a portion provided with external screw threads 16 for engaging screw threads 17 on the walls of the bore portion 7. An expansion spring 18 of coil formation is interposed between the bushing 15 and the valve disc 11 and exerts a pressure on the latter tending to hold the flange 12 against its seat. The pressure on the valve disc 11 can be adjusted by turning the bushing 15 relatively to the stem 1 to vary the tension on the spring 18.

A lock nut 19 is adapted to engage with the threads 16 to hold the adjusting bushing in adjusted position. The lock nut is provided with a counterbore 20 at its inner end adapted to receive a gasket 21 made of a compressible material which is compressed against the outer end of the stem 1 when the lock nut 19 is screwed into abutting relation to the stem 1 and a fluid tight joint between the stem 1 and the bushing 15 is thus insured.

A portion of the bushing 15 extending beyond the nut 19 is formed to provide a plurality of flat faces 22, each of which is provided with a scale 23, the graduations of which may have any suitable indicia (not shown) associated therewith, as for instance, pounds per square inch to indicate various pressures at which the valve disc 11 will be moved into open position against the action of the spring 18 to permit the escape of excess pressure fluid from the tube or tire 3. The outer end or face of the lock nut 19 cooperates when in abutting relation to the stem 1 with the scales 23 to indicate on the latter the pressure at which the valve 11 will open at any given time, the respective scales being so arranged that the indicated pressures on all scales at any given time will be the same.

It will thus be apparent that the valve 11 is a relief valve adapted to open at predetermined pressures to prevent excessive pressures within the tube or tire 3 because of overheating of the pressure fluid therein or other causes. A cap 24 threadedly engaging the bushing 15 adjacent to its outer end includes an elongated hollow body divided beyond the end of the bushing by a transverse partition 25. Arcuate apertures 26 formed through the walls of the cap 24 extend above and below the plane of the partition 25 and are separated or spaced apart by intervening imperforate portions 27, the partition 25 being rigidly secured at its outer edge to the imperforate portions 27.

A tubular cover 28 encompassing the cap 24 and the body 1 is provided at its free end with apertures 28′ of relatively small area.

A whistling sound will thus be caused by reason of the escape of a pressure fluid through the stem 1 and through the openings 26 of the cap 24 and the apertures 28′ of the cover 28.

An inwardly opening valve 29 preferably although not necessarily provided with a facing 30 of a compressible material, such as rubber, is loosely received within the bore portion or chamber 6 between the inner end of the tubular valve stem 14 and the shoulder 8 and is adapted to close the valve stem 14 at the inner end thereof when in abutting relation thereto. A stem for the valve 29 includes a rod-like section 31 extending through the compressible facing 30 and the tubular valve stem 14 beyond the outer end of the latter for an appreciable distance into the bore portion or relief valve chamber 7. A second rod-like section 32 has an enlarged end portion 33 provided with an axial socket 34 threadedly engaging the outer end portion of the section 31. The section 32 is of a length to extend loosely through the bore of the bushing 15 and to protrude slightly beyond the outer end of the latter. An expansion spring 35 coiled about the section 31 between the valve disc 11 and the proximate end of the enlargement 33 tends to hold the valve 29 in closing relation to the tubular valve stem 14. When it is desired to force a pressure fluid into the tube or tire 3, as in inflating the latter in an ordinary manner, the valve 29 is forced and held away from its seat by a pressure applied at the end of the stem section 32. Upon cessation of the pressure on the valve stem section 32, the spring 35 will act to return the valve 29 to a closing position.

It is desirable that means be provided to operate the whistle cap 24 when the pressure within the tube or tire 3 is relatively low. To this end, we provide a plunger head 36 loosely received within the bore portion or valve chamber 6 between the valve 29 and the shoulder 8, the plunger head being provided with a stem 37 extending loosely through the inner end portion 5 of the bore of the stem 1 and protruding beyond the inner end of the latter an appreciable distance within the tube or tire 3. A bumper head 38 made of a relatively soft material such as soft rubber or other compressible material which will not cut or injure the walls of the tube or tire 3 when in violent contact therewith is secured on the inner end of the plunger stem 37. The plunger head 38 is preferably of ovate or pear shape with the apex portion thereof proximate to the inner end of the stem 1 and is of such size as to be capable of being drawn through the bore of the stem 1 when compressed.

When the pressure within the tube or tire 3 is sufficiently low that the latter will be partially collapsed upon rotation in service of a wheel upon which the tube or tire is mounted, the walls of the tube or tire 3 opposite the inner end of the stem will contact the plunger head 38 at each revolution of the wheel and will drive the plunger head 36 against the valve 29, moving the latter and the valve stem 14 as a unit toward the outer end of the stem, whereby the valve 11 will be moved from closing position. Pressure fluid will be permitted to escape through the bore of the stem 1 and through the ports of the whistle cap 24, causing an audible signal as hereinbefore described and apprising interested persons of the condition of the tube or tire.

The device is simple in construction and thoroughly effective for the purposes for which intended.

Obviously, our invention is susceptible of embodiment in forms other than that in which illustrated in the accompanying drawings and we therefore consider as our own all modifications and adaptations thereof which fairly fall within the scope of the appended claims.

We claim:

1. A device of the character described comprising a tubular body adapted at one end for attachment to a pneumatic tube or tire, outwardly opening normally closed spring pressed valve means therein for controlling the bore of the tubular body, signal means adapted to be operated by pressure fluid escaping from the tube or tire through the tubular body, and means extending from the tubular body into the pneumatic tube or tire and adapted to be actuated upon a partial collapse of the walls of the latter to move the valve means from closing position, said last named means comprising a stem movable longitudinally in the bore of the tubular body, a plunger head at the end of the stem adjacent to the valve means but separate therefrom and a bumper head at the end of the rod disposed within tube or tire, said bumper head being made of a soft compressible material and being adapted to be drawn through the bore of the tubular body when compressed.

2. A device of the character described comprising a straight tubular body attachable at one end to a source of pressure, said body being provided with an outwardly facing internal shoulder located intermediate its length, a valve member fitting in the bore of said body outwardly of said shoulder and being spring pressed against said shoulder, said valve member having a central opening, a valve stem extending from said valve member inwardly of the tubular body in alignment with the central opening in the valve member, said valve stem being disposed in spaced relation to the bore of said tubular body, a second valve member spring pressed against the inner end of said tubular valve stem and normally preventing flow through the latter, and a valve stem for operating said second valve, said last named valve stem extending through said first named valve stem and through the central opening of the first named valve to terminate at its outer end outwardly of the first named valve, as and for the purpose described.

JOHN HAMILTON GALL.
GUS SWANSON.